INVENTORS
William F. Egbert &
Esten W. Spears, Jr.
BY Paul Fitzpatrick
ATTORNEY

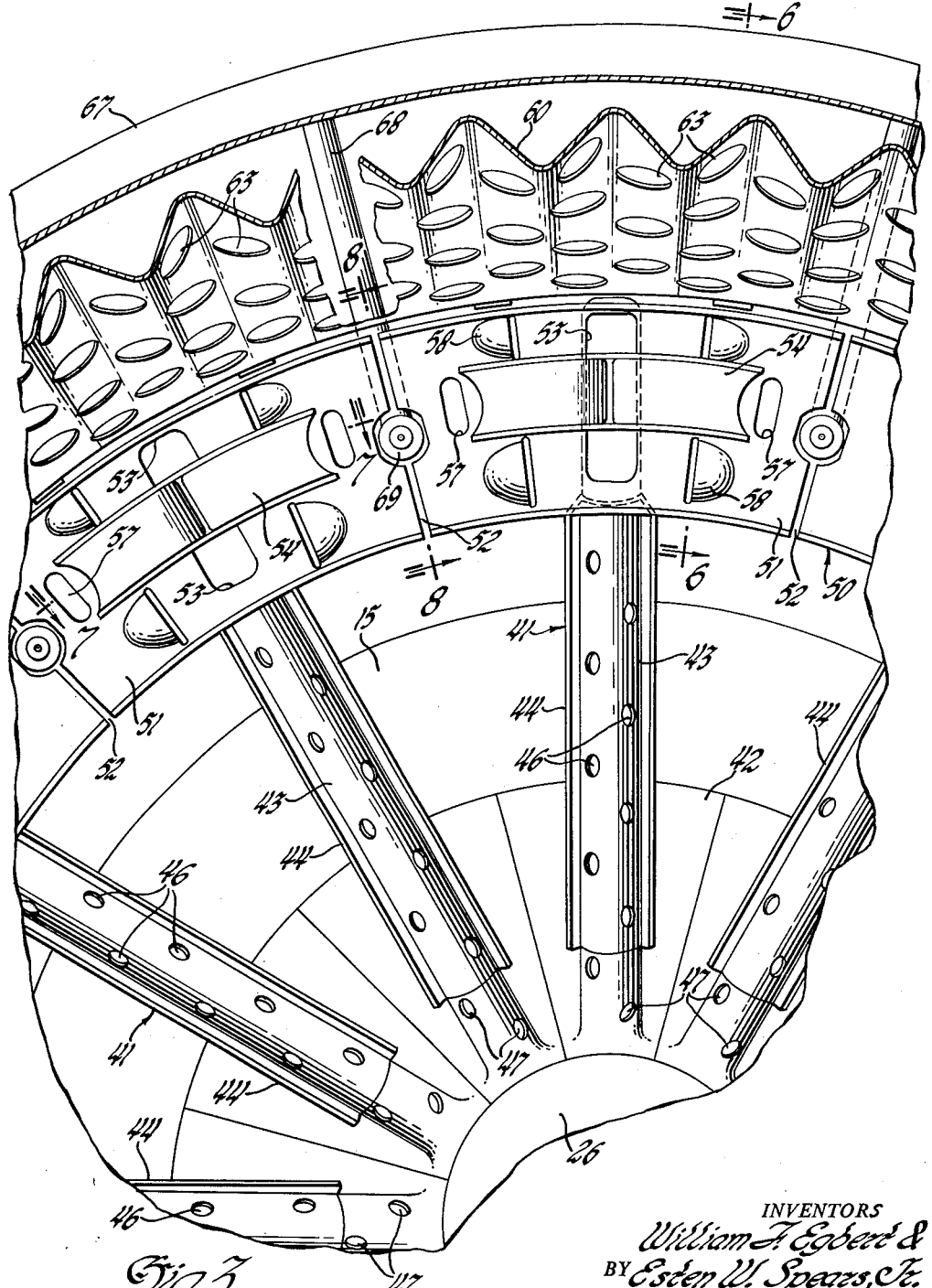

July 31, 1962 W. F. EGBERT ET AL 3,046,742
COMBUSTION APPARATUS
Filed Jan. 5, 1959 3 Sheets-Sheet 3
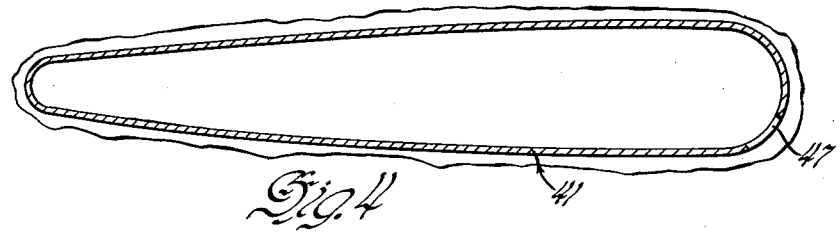
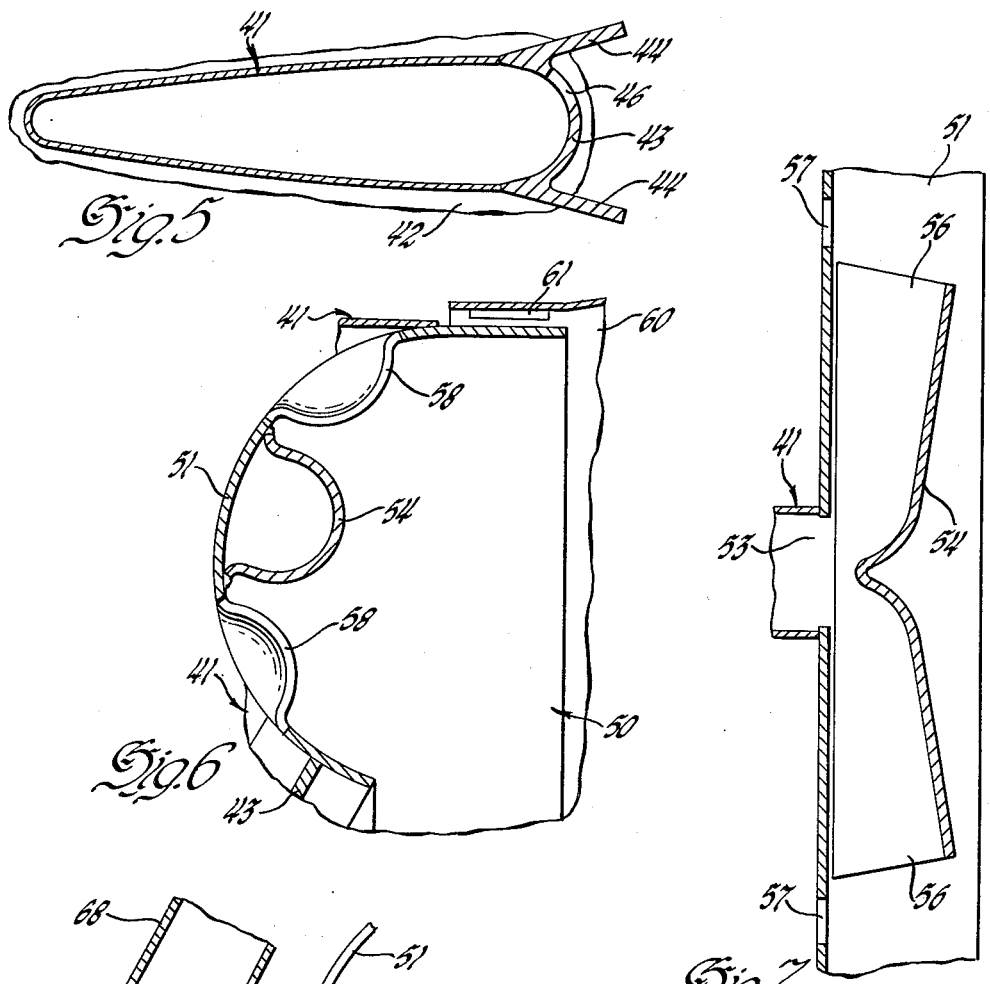
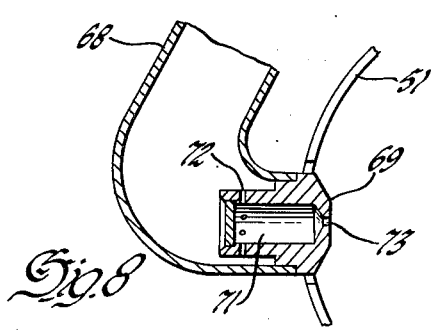
INVENTORS
William F. Egbert &
BY Esten W. Spears, Jr.
Paul Fitzpatrick
ATTORNEY

United States Patent Office 3,046,742
Patented July 31, 1962

3,046,742
COMBUSTION APPARATUS
William F. Egbert, Brownsburg, and Esten W. Spears, Jr., Indianapolis, Ind., assignors to General Motors Corporation, Detroit, Mich., a corporation of Delaware
Filed Jan. 5, 1959, Ser. No. 785,090
6 Claims. (Cl. 60—39.65)

Our invention relates to combustion apparatus and particularly to combustion apparatus for large ducts, such as are employed in aircraft jet propulsion engines. The preferred embodiment of the invention is particularly suited for an application in which fuel is gaseous and in which liquid fuel may be used at times to supplement the gaseous fuel. The preferred structure is particularly suited for installations in the exhaust duct of an engine; that is downstream from a turbine or the like, in the engine.

In its preferred embodiment, the invention is employed in an engine of the type known as an air turbo rocket, although the structure thereof and features thereof are applicable to other types of installations.

The principal objects of the invention are to provide a combustion apparatus suited for large ducts, and for both gaseous and liquid fuels, adapted to withstand high temperature and to provide good combustion in a relatively fast-moving air stream, and moreover a structure which is of very light weight so that it is adapted to aircraft propulsion.

The nature of the invention and the advantages thereof will be apparent to those skilled in the art from the succeeding detailed description of the preferred embodiment of the invention and the accompanying drawings thereof.

FIGURE 3 is a partial sectional view of the same taken on a plane normal to the axis of the engine indicated by the line 3—3 in FIGURE 2.

FIGURE 4 is a fragmentary sectional view taken on the plane indicated by the line 4—4 in FIGURE 2.

FIGURE 5 is a fragmentary sectional view taken on the plane indicated by the line 5—5 in FIGURE 2.

FIGURE 6 is a fragmentary sectional view taken on the plane indicated by the line 6—6 in FIGURE 3.

FIGURE 7 is a fragmentary sectional view taken on the plane indicated by the line 7—7 in FIGURE 3.

FIGURE 8 is a fragmentary sectional view taken on the plane indicated by the line 8—8 in FIGURE 3.

Figure 1:
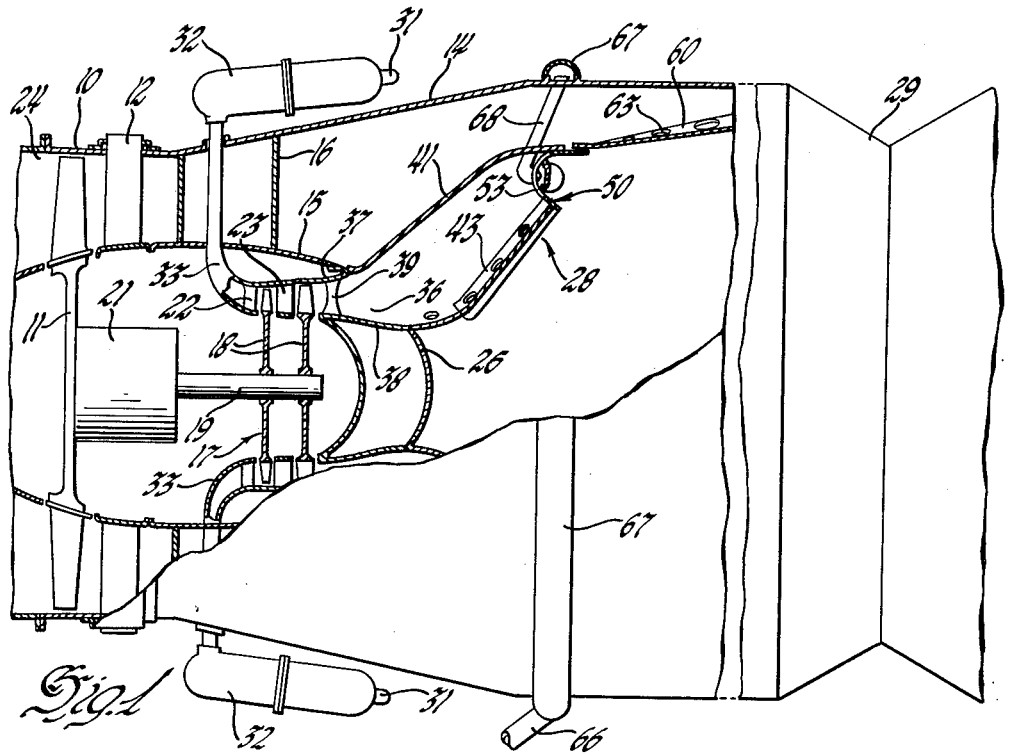
FIGURE 1 is a schematic drawing of an air turbo rocket engine incorporating the invention with parts cut away and in section.
Figure 2:
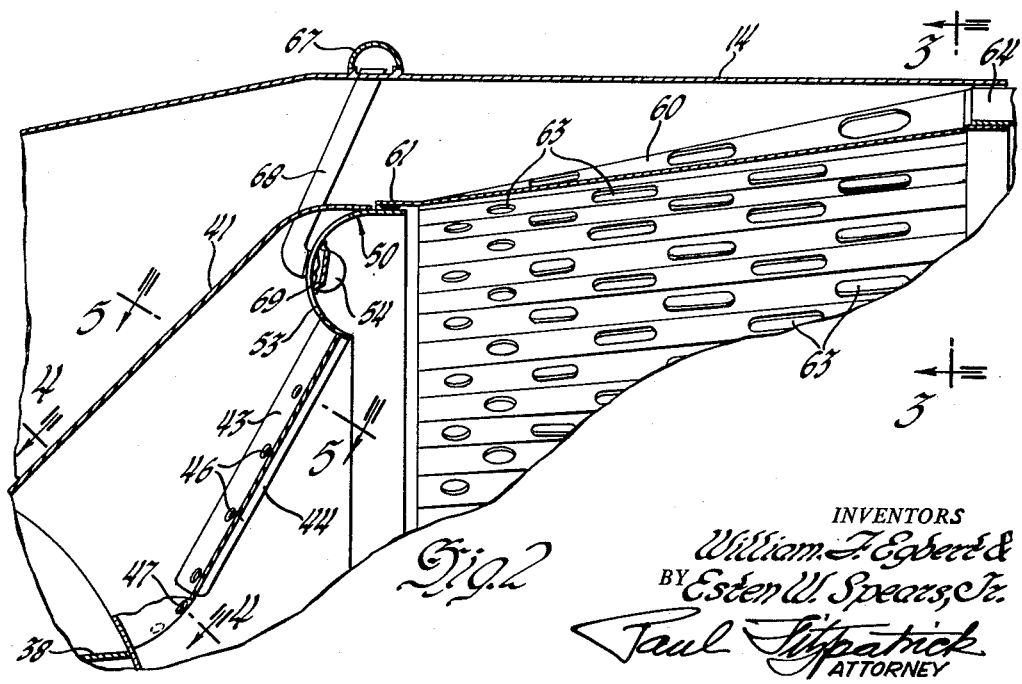
FIGURE 2 is a partial sectional view of the combustion apparatus taken on a plane containing the axis of the engine.

Referring first to FIGURE 1 for a general description of the preferred environment of the invention, this figure shows somewhat schematically an air turbo rocket engine including a fan having an outer case 10, a bladed wheel 11, and outlet guide vanes 12. The compressor discharges through a duct defined by the outer wall 14 of the engine and an inner wall or shrould 15, these being connected by a number of hollow struts 16. The fan wheel 11 is driven by two-stage turbine 17 comprising wheels 18 mounted on a shaft 19 connected to the fan through a reduction gear 21. The turbine comprises first and second stage nozzles 22 and 23, and is mounted within the inner shroud 15. Air enters the engine through an annular inlet duct 24, shown only partially, and after passing through the fan flows rearwardly through duct 14 which changes from annular to circular in section beyond the rear end portion 26 of the inner shroud or tailcone 15.

The combustion apparatus of the invention, indicated generally at 28, is mounted in the forward part of the duct 14. The duct continues for a length of the order of twice its diameter to provide adequate combustion space and discharges into a variable convergent-divergent propulsion nozzle 29, which may be of any suitable type. It will be noted that the fan does not discharge through the turbine. The turbine 17 is energized by a suitable gaseous medium, which may be a type of dissociation fuel, and which is burned in the combustion apparatus 28 after passing through the turbine. The fuel may be supplied from a suitable source through lines 31 and catalytic dissociation chambers 32 to a number of radial inlet pipes 33 discharging into the first stage turbine nozzle 22.

It will be understood that the details of the engine and the means for supplying the fuel to the turbine are immaterial to this invention and, therefore, no attempt is made to describe them in detail.

Our invention is concerned with the provision of superior combustion apparatus to burn the dissociation products of the fuel in the air stream flowing through the engine to provide a high energy jet through the nozzle 29 for aircraft propulsion. The flow of air through the engine may be due in large measure to the effect of ram due to forward speed of the aircraft, and is not primarily dependent at aircraft high speeds upon the action of fan 11. For this reason, operating conditions may arise in which the turbine 17 is unloaded, or is running at such light load that the motive fluid requirement of the turbine is below the fuel rate needed for energization of the jet discharge from nozzle 29. For this reason, supplementary fuel in liquid form may be introduced and burned in apparatus 28 when circumstances require it.

The problems and difficulties involved in a combustion apparatus of this type are those of causing adequate fuel and air mixing, providing adequate flameholding, and minimizing interference with air flow, which causes losses of power. From the structural or mechanical standpoint the problems include provision of a lightweight structure which is capable of withstanding the high temperatures and whatever mechanical loads may be imposed by pressure, buffeting, and accelerations.

Referring now additionally to FIGURES 2 to 8, the turbine 17 discharges into an annular space 36 between an outer wall or shroud 37 and an inner wall or shroud 38. The chamber 36 constitutes an inlet chamber to the combustion apparatus 28 for the gaseous fuel. Walls 37 and 38 are connected by a number of struts 39.

Chamber 36 discharges into a number of hollow struts 41, preferably twelve in number, which extend radially and rearwardly toward the duct wall 14.

It will be most clearly apparent from FIGURES 4 and 5 that the struts are of a more or less streamlined form with a much greater dimension in the direction of the axis of the engine than in the circumferential direction. These struts may be formed from sheet metal, and each is integral with an arcuate plate 42 at its inner end. The plates 42 are joined by seam welding or the like to form an annular section of the inner shroud or tailcone 15. The center or rear end 26 of the tailcone is defined by a dished circular plate welded in place.

The gaseous decomposition products of the fuel, after passing through the turbine, flow rearwardly and outwardly through the struts and are discharged through various ports which provide for intimate mixture of the fuel with the air flowing through the engine. The structure provides flame holding gutters which create turbulence. The rear edge of each strut 41, through the major part of its extent, is defined by a plate 43 which is more or less W-shaped in cross section, as shown in FIGURE 5, and includes two webs 44 extending rearwardly which provide a flame holding gutter between them. A number of fuel orifices 46 provided in the plate 43 are staggered as shown in FIGURE 3, and are located so as to direct the fuel against the inner surface of each web 44. The fuel is thus caused to fan out in a direction radially of the engine as it impinges on the web 44, and is engaged by the air flowing past the outer surface of the strut. The air and fuel will be mixed intimately by the turbulence downstream of the strut. Preferably, two additional fuel orifices 47 are provided at the inner ends of the struts.

A considerable part (preferably about two thirds) of the fuel flows through the outer ends of the struts where it is discharged into a mixing and flame holding ring 50 made up of a number of segments 51, one segment being welded or brazed to the outer end of each strut. Expansion gaps 52 are left between the ends of the segments. Each segment 51 of the ring 50 includes means for mixing the fuel and air thoroughly. The outer end of the strut discharges through an outlet 53. A circumferentially disposed fuel deflector 54 overlies the central part of the outlet 53. The radially inner and outer edges of the deflector are fixed to the segment 51, and the ends of the deflector provide fuel discharge openings at 56. As will be apparent, this part of the fuel is discharged in a circumferential direction. An air hole 57 through the segment at each end of the deflector provides a jet of rearwardly flowing air which impinges on the fuel, setting up turbulence and mixing.

The wall of the segment 51 is struck out to provide four air inlet ports with louvers 58 which deflect air flowing through them toward the outlet 53 to mix air with the portion of the fuel which flows through outlet 53 inwardly and ouwardly of deflector 54.

As will be apparent, the ring 50 is spaced considerably from the outer wall 14 of the air duct, and additional air flows through the space between the ring 50 and wall 14. This air, which may provide for completion of combustion, is admitted to the combustion area through an apertured combustion liner 60 which tapers outwardly toward the rear so that its rear end is adjacent the wall 14, where it is supported in any suitable manner. The forward end of the liner 60 includes a ring 61 which pilots over the flame holder ring 50. As will be more clearly apparent from FIGURE 3, the liner 60 is of a corrugated construction, the corrugations extending axially of the liner and increasing from no depth at the forward end to a considerable depth at the rear end. A large number of combustion air admitting holes 63 are punched or otherwise provided in the liner.

The rear end of the combustion section preferably includes a liner or shroud 64 which serves to shield the wall 14 to some extent from the heat of combustion. The structure of this liner is immaterial to the invention.

As will be apparent to those skilled in the art, the structures 41, 50, and 60 provide for ready passage of large volumes of air with a small pressure drop and also provide a very thorough mixing of the fuel and air to insure prompt combustion. In addition, the gutters 43 and flame holder ring 50 provide a sheltered turbulent zone behind their concave rear faces to prevent blowout of the flame.

As previously stated, under some conditions of engine operation, more fuel may be required than is needed to operate the turbine 17. For this reason, the combustion apparatus includes means for spraying or atomizing liquid fuel into the combustion zone. This fuel is supplied through a conduit 66 to a ring manifold 67 welded or brazed to the outer wall 14. Manifold 67 communicates through twelve radial pipes 68 (FIGURES 2 and 8) with fuel spray nozzles 69 of known type mounted on the inner ends of the pipes 68. The fuel nozzles 69 are preferably of the type which defines a swirl chamber 71 into which fuel is admitted through tangential swirl ports 72 from the pipe 68 and from which the fuel is discharged in a cone of atomized spray through the orifice 73. The fuel supplied through line 66 may be the same chemically as that supplied through line 31. It remains in the liquid state, since it has not been passed through the dissociation chambers 32. Combustion of the gaseous fuel aids in vaporizing and burning the liquid fuel.

This invention is not concerned with the means for controlling the amount of fuel supplied to the turbine or to the manifold 67.

Since the preferred embodiment of the invention is intended for use with a hypergolic fuel, no ignition means is provided. It will be apparent that any suitable ignition means could be provided if a structure embodying the invention were used with a fuel which required ignition.

Although the type of fuel for which the preferred embodiment of combustion chamber was particularly designed is hypergolic, it nevertheless requires a very thorough mixing of the fuel and air for complete, efficient combustion and requires means for stabilization of the flame. It will be apparent that the structure illustrated very thoroughly mixes the fuel and air over the central part of the duct 14 and out to the outer margin of ring 50, and that the additional combustion air entering through liner 60 also mixes well with the fuel to complete combustion.

The turbulence in the lee of the flame holder ring 50 provides for very effective mixing of the fuel from the spray fuel nozzles 69 with the air. The corrugations of the liner 60 are provided for structural strength and to suppress combustion screech.

It will be apparent to those skilled in the art that the structure described is exceedingly well adapted to maintain and support combustion and to provide a minimum resistance to flow of air through the engine, and that it accomplishes this with a structure of very low weight.

The description of the preferred embodiment of the invention for the purpose of explaining the principles thereof is not to be construed as limiting or restricting the invention, since many changes may be made by the exercise of skill in the art within the scope of the invention.

We claim:

1. A combustion apparatus comprising, in combination, a duct adapted to convey air, structure defining an inlet chamber for gaseous fuel adjacent the axis of the duct, a plurality of hollow struts radiating from the structure communicating with the chamber, the struts having fuel outlets distributed along the struts and flame holding means on the struts, an annular segmented gaseous fuel discharge and mixing and flame holding ring composed of segments mounted on the outer ends of the struts supplied with fuel through the struts and with air through the duct, and nozzle means for introducing a liquid fuel into the duct, the nozzle means comprising nozzles mounted between the ring segments and fuel supply tubes supporting the nozzles in the duct.

2. A combustion apparatus comprising, in combination, a duct adapted to convey air, structure defining an inlet chamber for gaseous fuel adjacent the axis of the duct, a plurality of hollow struts radiating from the structure communicating with the chamber, the struts having fuel outlets distributed along the struts and flame holding means on the struts, an annular segmented gaseous fuel discharge and mixing and flame holding ring mounted on the outer end of the struts supplied with fuel through the struts and with air through the duct, and an apertured combustion liner mounted on and around the said ring extending therefrom downstream of the duct.

3. A combustion apparatus comprising, in combination, a duct adapted to convey air, structure defining an inlet chamber for gaseous fuel adjacent the axis of the duct, a plurality of hollow struts radiating from the structure communicating with the chamber, the struts having fuel outlets distributed along the struts and flame holding means on the struts, an annular segmented gaseous fuel discharge and mixing and flame holding ring composed of segments mounted on the outer ends of the struts supplied with fuel through the struts and with air through the duct, an apertured combustion liner mounted on and around the said ring extending therefrom downstream of the duct, and nozzle means for introducing a liquid fuel into the liner, the nozzle means comprising nozzles mounted between the ring segments and fuel supply tubes supporting the nozzles in the duct.

4. A combustion apparatus comprising, in combination, a duct adapted to convey air, a flame holding and mixing ring mounted in the duct, the ring having a concave downstream face, means for supplying gaseous fuel to the ring, means on the ring providing outlets for the fuel directed axially of the ring, the ring providing ports for air flowing the duct including means to direct the air circumferentially of the ring into impingement with the fuel discharged from the said outlets, and means on the ring providing discharge openings for the fuel directed circumferentially of the ring, the ring having holes therein providing passage for air axially of the ring adjacent the discharge openings to direct the air into impingement with the fuel discharged from the said openings.

5. A combustion apparatus comprising, in combination, a duct adapted to convey air, a flame holding and mixing ring mounted in the duct, the ring having a concave downstream face, means for supplying gaseous fuel to the ring, means on the ring providing outlets for the fuel directed axially of the ring, the ring providing ports for air flowing through the duct including means to direct the air circumferentially of the ring into impingement with the fuel discharged from the said outlets, means on the ring providing discharge openings for the fuel directed circumferentially of the ring, the ring having holes therein providing passage for air axially of the ring adjacent the discharge openings to direct the air into impingement with the fuel discharged from the said openings, and means mounted adjacent the ring for spraying liquid fuel into the area adjacent the downstream face of the ring.

6. A combustion apparatus comprising, in combination, a duct adapted to convey air, a flame holding and mixing ring mounted in the duct, the ring having a concave downstream face, a plurality of conduits in the duct for supplying gaseous fuel to the ring, the conduits being adapted to be connected to means for supplying gaseous fuel to the conduits, the conduits terminating in outlets for the fuel at the ring directed axially of the ring, the ring providing ports for air flowing through the duct including means to direct the air cirumferentially of the ring into impingement with the fuel discharged from the said outlets, and baffle means on the ring bridging the outlets providing discharge openings for the fuel directed circumferentially of the ring, the ring having holes therein providing passage for air axially of the ring adjacent the discharge openings to direct the air into impingement with the fuel discharged from the said openings.

References Cited in the file of this patent
UNITED STATES PATENTS

| | | |
|---|---|---|
| 2,385,833 | Nahigyan | Oct. 2, 1945 |
| 2,480,345 | Watts | Aug. 30, 1949 |
| 2,482,505 | Pierce | Sept. 20, 1949 |
| 2,485,244 | Sanborn | Oct. 18, 1949 |
| 2,540,594 | Price | Feb. 6, 1951 |
| 2,602,292 | Buckland et al. | July 8, 1952 |
| 2,620,625 | Phaneuf | Dec. 9, 1952 |
| 2,693,083 | Abbott | Nov. 2, 1954 |
| 2,734,341 | Lovesey | Feb. 14, 1956 |
| 2,771,743 | Lovesey | Nov. 27, 1956 |
| 2,827,759 | Bruckmann | Mar. 25, 1958 |
| 2,872,785 | Barrett et al. | Feb. 10, 1959 |
| 2,920,445 | Bailey | Jan. 12, 1960 |